United States Patent
Eldevik

(10) Patent No.: US 9,497,933 B2
(45) Date of Patent: Nov. 22, 2016

(54) DEVICE FOR LIMITING THE MOVEMENT OF A FOUR-LEGGED ANIMAL

(71) Applicant: Dog Activities AS, Borkenes (NO)

(72) Inventor: Frode Eldevik, Borkenes (NO)

(73) Assignee: Dog Activities AS, Borkenes (NO)

( * ) Notice: Subject to any disclaimer, the term of this patent is extended or adjusted under 35 U.S.C. 154(b) by 0 days.

(21) Appl. No.: 14/434,668

(22) PCT Filed: Sep. 3, 2013

(86) PCT No.: PCT/IB2013/058243
§ 371 (c)(1),
(2) Date: Apr. 9, 2015

(87) PCT Pub. No.: WO2014/060866
PCT Pub. Date: Apr. 24, 2014

(65) Prior Publication Data
US 2015/0257363 A1  Sep. 17, 2015

(30) Foreign Application Priority Data

Oct. 17, 2012 (NO) .................................. 20121206
Feb. 15, 2013 (NO) .................................. 20130259

(51) Int. Cl.
*A01K 15/02* (2006.01)
*A01K 15/04* (2006.01)
(Continued)

(52) U.S. Cl.
CPC ........... *A01K 15/023* (2013.01); *A01K 15/021* (2013.01); *A01K 15/04* (2013.01); *A01K 27/002* (2013.01); *A01K 27/009* (2013.01); *A01K 29/00* (2013.01)

(58) Field of Classification Search
CPC .. A01K 27/002; A01K 27/009; A01K 15/04; A01K 15/02; A01K 15/021; A01K 15/023; A01K 29/00
USPC ....................................... 119/792–798; 54/71
See application file for complete search history.

(56) References Cited

U.S. PATENT DOCUMENTS

| 78,082 A | 5/1868 | Gray |
| 2,534,727 A | 12/1950 | Moyle |

(Continued)

FOREIGN PATENT DOCUMENTS

| AU | 644431 B2 | 10/1991 |
| DE | 202004011942 U1 | 1/2005 |

(Continued)

OTHER PUBLICATIONS

International Search Report issued in PCT/IB2013/058243 mailed on Nov. 11, 2013 (2 pages).
(Continued)

*Primary Examiner* — Patrick Hawn
(74) *Attorney, Agent, or Firm* — Osha Liang LLP

(57) ABSTRACT

A device for restricting a movement of a four-legged animal may include an animal harness, bands, a cord, and an actuator. The animal harness may include neck straps, chest straps, a tubular guide, a back piece, back straps, and two pulleys. The two pulleys may be arranged at respective ends of an elastic cord means, which may be fastened to the animal harness. The bands may be arranged around hind legs of the four-legged animal. The cord may be arranged from each band to the animal harness via the two pulleys. The actuator may be fastened to a forward part of the animal harness and may tighten the cord. Further, the actuator may include an electric motor that tightens the cord. Furthermore, the actuator may be activated by a receiver unit that receives signals from a transmitter unit.

7 Claims, 3 Drawing Sheets

(51) Int. Cl.
*A01K 27/00* (2006.01)
*A01K 29/00* (2006.01)

(56) References Cited

U.S. PATENT DOCUMENTS

| | | | |
|---|---|---|---|
| 3,994,264 A | 11/1976 | Flynt | |
| 4,528,944 A | 7/1985 | Reed et al. | |
| 4,651,678 A * | 3/1987 | Kime | A01K 15/027 |
| | | | 54/71 |
| 4,919,082 A | 4/1990 | Tsai | |
| 5,588,398 A * | 12/1996 | Allen, II | A01K 25/00 |
| | | | 119/822 |
| 6,354,247 B1 * | 3/2002 | Andrews | A01K 27/002 |
| | | | 119/816 |
| 7,150,248 B2 * | 12/2006 | Hodl | A01K 15/02 |
| | | | 119/818 |
| 7,444,960 B1 * | 11/2008 | Williams | A01K 25/00 |
| | | | 119/761 |
| 7,963,255 B2 * | 6/2011 | Horgan | A01K 27/002 |
| | | | 119/792 |
| 7,963,256 B1 | 6/2011 | Horgan | |
| 8,171,892 B1 * | 5/2012 | Horgan | A01K 27/002 |
| | | | 119/792 |
| 8,516,978 B2 * | 8/2013 | Horiuchi | A01K 15/04 |
| | | | 119/792 |
| 2003/0116102 A1 * | 6/2003 | Schwartz | A01K 15/02 |
| | | | 119/720 |
| 2010/0242861 A1 | 9/2010 | Arreola | |
| 2011/0297105 A1 | 12/2011 | Horiuchi | |
| 2013/0174795 A1 * | 7/2013 | Lamkin | A01K 27/009 |
| | | | 119/720 |
| 2014/0326196 A1 * | 11/2014 | Lauscher | A01K 15/02 |
| | | | 119/720 |
| 2014/0331940 A1 * | 11/2014 | Herrmann | A01K 15/02 |
| | | | 119/712 |

FOREIGN PATENT DOCUMENTS

| | | |
|---|---|---|
| DE | 102006010838 A1 | 9/2007 |
| GB | 2480061 A | 11/2011 |
| JP | 2004-065219 A | 3/2004 |
| WO | 9951088 A1 | 10/1999 |

OTHER PUBLICATIONS

Written Opinion of the International Searching Authority issued in PCT/IB2013/058243 mailed on Nov. 11, 2013 (6 pages).

* cited by examiner

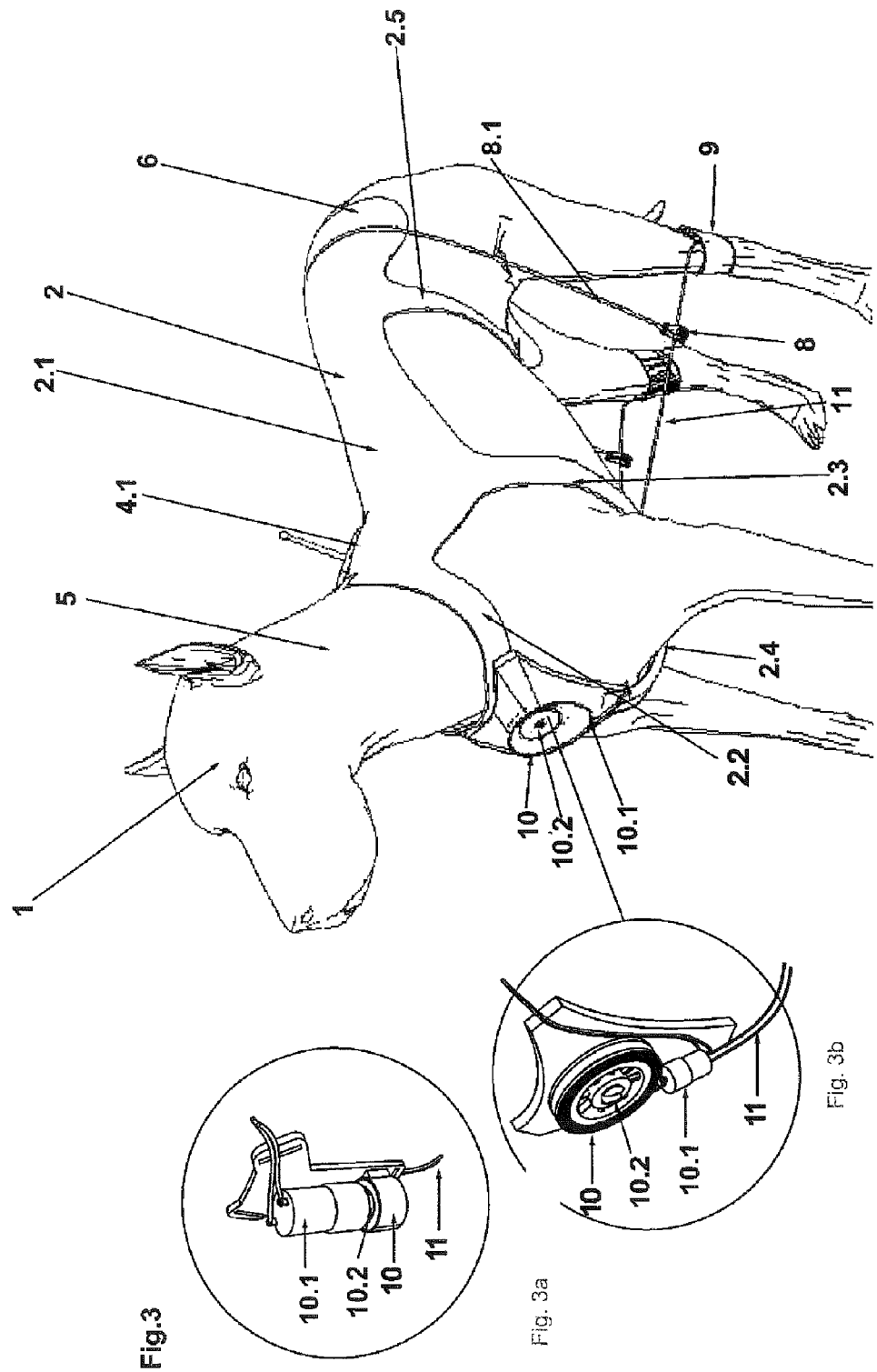

DEVICE FOR LIMITING THE MOVEMENT OF A FOUR-LEGGED ANIMAL

FIELD OF THE INVENTION

The invention relates to a method and device for physically preventing a four-legged animal from running or jumping by wireless activation from a transmitter (owner). This invention is primarily intended for dogs, but can, within the scope of protection, also be used for other animals. When the device is not activated, the animal is able to move quite freely.

BACKGROUND

Many dog owners feel guilty that they do not exercise their dog enough, and there are many cases in which dog owners would like to let their dog off the lead. This may, for example, be to exercise the dog by letting it run freely in parks or other large areas, alternatively when the owner cycles or runs with the dog in the woods, or when the owner goes skiing. In many cases, the lead between dog and owner causes dangerous situations, and in particular when dog and owner are in motion. Not all dog owners have access to fenced-in areas where they can let their dog loose, and a walk with the dog on a lead does not provide sufficient exercise. The lead may also cause injuries to the dog's throat or neck. A Norwegian survey shows that of 350 dogs, 75% will struggle with neck problems that result in states of pain without the owner necessarily being aware of this. When dog owners pull hard on the lead, this results in trauma to the neck vertebrae, which leads to pressure on the nerves (source: Jenny Rolness NOAH). A loose dog is a happy dog, and a happy dog gives happy dog owners.

If a dog owner wishes to let his/her dog go free whilst wanting control and hoping to stop the dog from running if it does not obey orders when being exercised, there is known from DE202004011942(U1) an electric dog collar device with a plurality of electrical contacts directed against the dog's throat. There is an electric battery and a chain between the collar and the person walking the dog. The dog walker can trigger electric shocks against the dog's throat via the chain as required in order to control the dog's behaviour. In DE102006010838(A1), a neck band on a dog can be wirelessly remote-controlled by the owner to be tightened/slackened around the dog's neck with the aid of battery power and an electric motor, and in U.S. Pat. No. 4,919,082(A) a fairly similar wireless collar is discussed, which can controllably apply pressure to the dog's neck. These known wireless or wired devices affect the dog's neck with whatever disadvantages/injuries this may inflict upon the dog. On the basis of interviews with many dog owners, electric collars do not work as intended. Electric collars are also illegal in many countries and it is unfortunately easy to misuse this form of control such that the dog becomes an insecure and nervous animal. When a dog's instincts are aroused enough there are no guarantees that the dog will stop when given an electric shock/vibration, and even less that the dog will understand the connection between shocks and undesirable behaviour. Choking the dog's neck is very inhumane, and this is probably one reason such solutions are not on sale in some places.

Other devices that try to restrain the movement of a dog are static harnesses that are described with slightly different designs in the known documents WO9951088(A1), U.S. Pat. No. 4,528,944, US2010242861(A1), GB2480061(A), AU644431(B), U.S. Pat. No. 3,994,264, US2011297105 (A1), U.S. Pat. No. 7,963,256(B1) and U.S. Pat. No. 2,534,727. The principle and purpose of all these devices differ essentially from the present invention, as the object is to prevent the dog from pulling on the chain between dog and owner (the person walking the dog), where tension in the chain is transferred to different means connected to the dog's legs.

The object of the present invention is to give dog owners a way of stopping their dog from running or jumping if it is let loose and does not obey verbal command. Although most dogs remain in the vicinity of their owner if they are let loose, there is never 100% certainty they will do so. The aim is also that when the device is passive, the dog can move as freely as it wants without being connected to its owner on a lead, but when activated, it has the purpose of physically preventing the dog's legs from making running movements such that it is impossible for the dog to run or jump.

The device will also work well for training the dog, as there is no doubt as to what the owner wants when the dog moves outside an accepted zone and the device is activated. This means that it is possible to train the animal to stop when the owner wants it to do so. In addition, it is possible to cycle with the dog and not run the risk of being pulled over. The dog can be let loose from its owner in the park so that it is able to have a good run without the owner needing to worry that the dog is going to run away, jump up or disturb others.

SUMMARY OF THE INVENTION

The present invention relates to a device for restricting the movement of a four-legged animal, the device comprising:
- an animal harness with neck straps, chest straps and a tubular guide;
- bands arranged on the animal's hind legs;
- a cord arranged from each band to the animal harness;
- an actuator for tightening the cord, which actuator is arranged on the animal harness; characterised in that:
- the animal harness further comprises a back piece running from the animal's neck to the vicinity of the animal's hip, back straps running from the back piece close to the animal's hind legs and under the animal's abdomen, two pulleys arranged at respective ends of an elastic cord means, which elastic cord means is fastened to the animal harness;
- the cord is arranged between respective bands and the animal harness via respective pulleys;
- the actuator is fastened to the forward part of the animal harness;
- the actuator comprises an electric motor provided for tightening the cord;
- the actuator is capable of being activated by a receiver unit able to receive signals from a transmitter unit, where, when a signal is received from the transmitter unit of the signalling unit, the electric motor is actuated and the cord is shortened, thereby restricting the movement of the four-legged animal.

The device is primarily intended for use with dogs, but can also be used on other animals, such as horses or the like.

The receiver unit and transmitter unit preferably communicate wirelessly. The electric motor can be provided with a sheave on which the cord is shortened by the electric motor spinning the sheave around its own axis. The actuator may be fastened to a neck fastening provided by the neck straps of the animal harness, whilst the elastic cord means can be fastened to the animal harness behind the back straps. The receiver unit may be located on the back piece of the animal harness and is, for example, connected to the electric motor by means of electric wires.

In other words, the invention relates to a device for restricting movement of the hind legs of a four-legged animal, specifically a dog, where the device comprises:
- a dog harness with neck straps, chest straps and tubular guide;
- a cord arranged from bands on the dog's hind legs to the animal harness, which cord is remote-controlled by an owner;

characterised in that
- the animal harness comprises a back piece and back straps, pulleys and elastic cord means;
- the cord is arranged from bands to a sheave on the dog harness;
- the device comprises a wireless master unit and a slave unit connected to an electric motor attached to the sheave;
- the elastic cord means is attached at one end to the back piece in the position of the dog's hip and at its free end to the pulleys, the cord being arranged from the band on the right hind leg via the associated pulley on the same side via the tubular guide to the sheave, then via the tubular guide to the pulley on the dog's left side to the band on the left hind leg;

where the length of stride of the hind legs can be changed intermittently independent of the previous length of stride of the dog's legs in that the length of the cord is changed by being wound off from and onto a sheave by the owner with the aid of the wireless master unit and slave unit.

In this case, the dog harness has a back piece running from the dog's pelvic area to its shoulders and partly up along the neck, and is secured to the dog's body at the pelvis by a back strap running under the abdomen, at the chest in a similar manner by a chest strap and at the neck in a similar way by a neck strap, where the last-mentioned and the chest strap between the forelegs are interconnected via the tubular guide and a neck fastening, the cord running from the bands via the tubular guide to the sheave arranged on the neck fastening.

The electric motor is powered by a battery and receives control signals sent wirelessly from an owner via a master unit arranged on the owner to the slave unit, which in turn is arranged on the dog harness. The sheave may be fitted to a controllable spring. The band is normally arranged on the dog's hind legs just above and in proximity of the knee joint.

The object is achieved according to the invention in that the length of stride of the hind legs can be intermittently changed by the owner as required and independent of the previous length of stride of the dog's legs and without the dog being connected by a chain to its owner.

DETAILED DESCRIPTION

The invention is set forth the following description of an example of an embodiment with reference to figures, and also in the patent claims.

The figures are as follows:

FIG. 1, which shows an outline of the device when not activated and with a person handling a remote control for the device.

FIG. 2, which is a side view of the device on a dog when activated. FIG. 3, which shows the device in perspective.

FIG. 3 illustrates the device in perspective, put on a dog.

FIGS. 3a and 3b show a detailed section of two alternative mechanisms for the sheave for the cord shown in FIG. 3.

An exemplary embodiment in accordance with the invention will be described in more detail below with reference to the figures.

The terms "master unit" and "slave unit" are used in the description of the embodiment below. By these terms is meant communication devices in the form of a transmitter device (master unit) and a receiver device (slave unit), where the transmitter device is capable of sending signals that the receiver device is able to receive.

Figure 1:
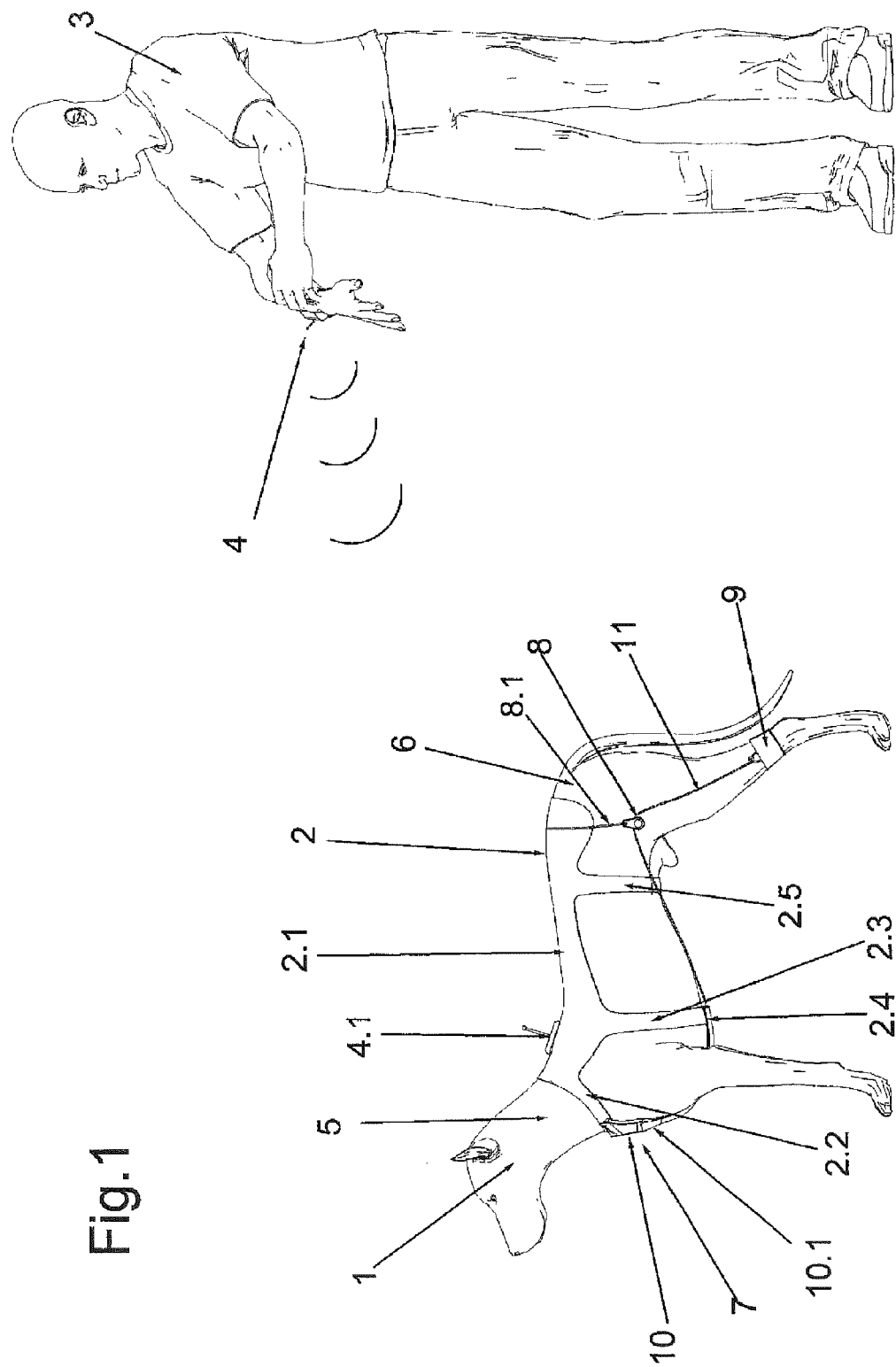

FIG. 1 shows a side view of a dog 1 on which the device is adapted to a dog harness 2, and, to the right in the picture, an owner 3 equipped with a wireless master unit 4. The dog harness 2 is configured with a back piece 2.1 running from the dog's neck 5 to the vicinity of the dog's hip 6. The back piece 2.1 consists of a continuous part which at the front end, close to the neck 5, branches into two neck straps 2.2, one on each side of the neck 5, which meet under the neck 5 and are joined in a suitable manner in a neck fastening 7. These two neck straps 2.2 can also, together, form a closed rigid ring that can be passed over the dog's 1 head when taking the harness off or putting it on. On the back piece 2, at a suitable distance behind the neck straps 2.2, is arranged a pair of chest straps 2.3 running down on respective sides of the back just behind the forelegs and ending on each side of the chest. The chest straps 2.3, at the end furthest from the back piece immediately behind the dog's forelegs, are attached to a tubular guide 2.4. The tubular guide runs from the chest straps 2.3 to the neck fastening 7. Furthermore, a pair of back straps 2.5 run from the back piece 2.1 in the vicinity of the dog's hind legs and under the dog's abdomen where they can be joined in a suitable manner, for example, by means of a hook and loop fastener. Behind the back straps 2.5 are arranged respective elastic cord means 8.1 on each side of the dog's hips and a pulley 8 at the end. The elastic cord means may be an ordinary elastic cord, that is to say a cord with elastic properties. Alternatively, the elastic cord means may be a cord coiled up on a spring-loaded reel, which allows the cord to be reeled out from the reel when the cord is pulled with a predetermined force, and which is capable of reeling the cord in on the reel again when the force on the cord is reduced. On each of the dog's hind legs between the hip joint and the knee joint and close to the last mentioned knee joint, there is secured a resilient band 9. A resilient band 9 secured at this point will, owing to the dog's anatomy, slip neither upwards nor downwards along the dog's leg.

Attached to the neck fastening 7 is a rotating sheave 10. The sheave 10 is further attached to a shaft that is operated by an electric motor, electric motor 10.1. A cord 11 is fastened to the band 9 on the dog's 1 left hind leg, and runs thence via the left-hand pulley 8 into the tubular guide 2.4 by the chest straps 2.3 between the forelegs and up to the sheave 10. From the sheave 10, the cord 11 then runs back via the tubular guide 2.4 out onto the right side of the dog 1 and then to the right-hand pulley 8 and rearward to the band 9 on the right hind leg.

Alternatively, a similar solution is conceivable where the cords 11 and the bands 9 are replaced by slightly wider flat tapes that run out onto the dog's flank approximately at the chest strap 2.3 and run behind both hind legs and bottom and then forward on the other side until on a level with the chest strap there. On the chest where the chest straps 2.3 meet is the electric motor 10.1 that tightens/slackens the flat tape. The dog's hind legs can thus be restrained from kicking back, thereby preventing large movements. This solution is not found illustrated in the figures.

The electric motor 10.1 is attached to the neck fastening 7 in a suitable manner via a shaft 10.2 to the sheave 10 and is powered by a battery that cannot be seen from the figure. A biased spring (not shown) may alternatively be attached to the shaft 10.2 instead of the electric motor 10.1. The electric motor 10.1 or the spring is actuated by the owner 3 via the master unit 4. The master unit 4 is in wireless connection with a slave unit 4.1 attached to the back piece 2.1. The cord 11 is tightened via the pulleys 8 and the elastic cord means 8.1 such that the cord 11 from the dog's hind legs runs in a vertical line up to the top joint of the hind legs, the hips 6. This means that the cord 11 on both sides of the dog's hips 6 does not present any obstacle to the dog's movement, and that the cord 11 does not get caught on trees and undergrowth in the woods.

Figure 2:
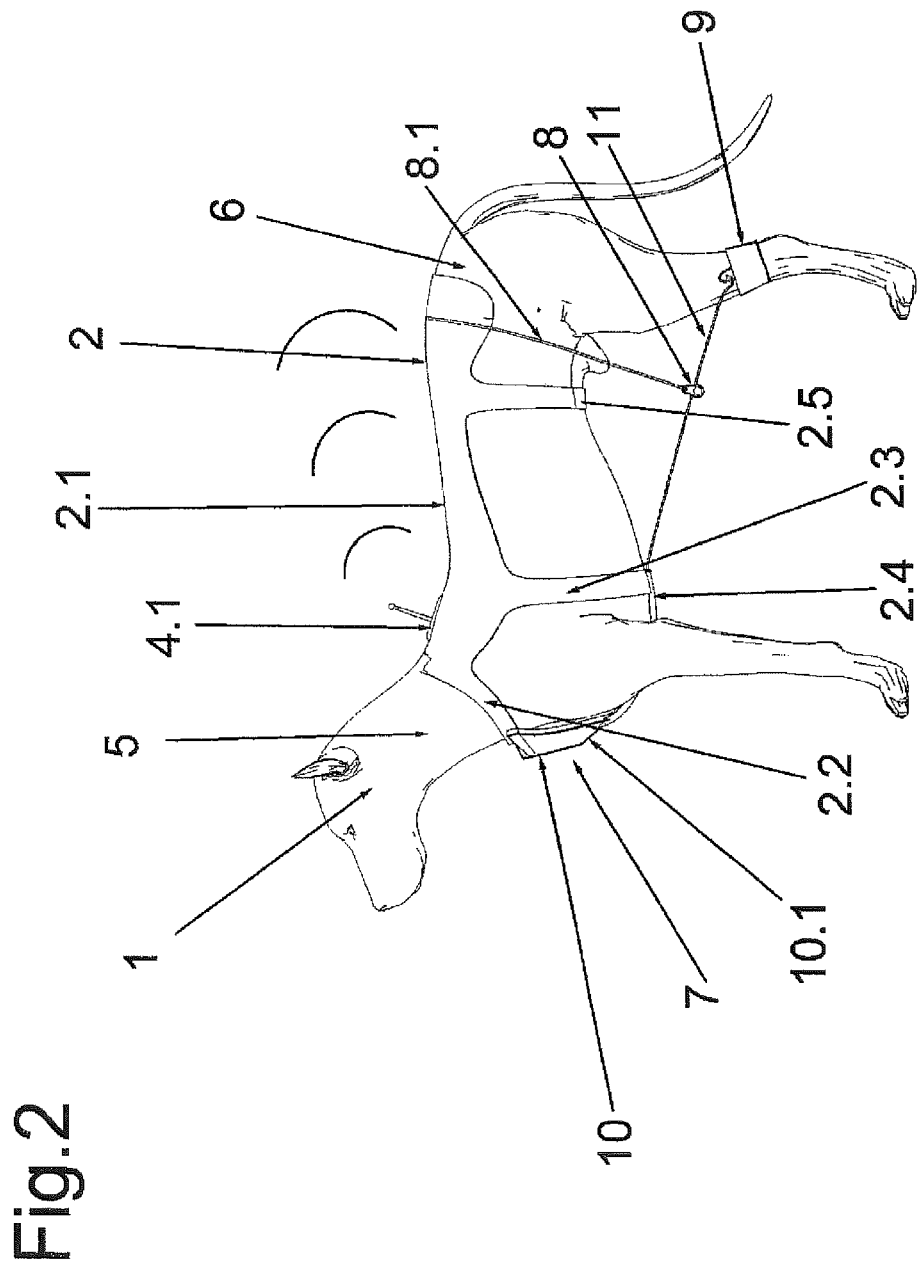

From FIG. 2 it can be seen what happens when the owner 3 has activated the master unit 4 and the dog harness 2 is activated in that the slave unit 4.1 relays signals to the electric motor 10.1 on the dog's neck fastening 7. When the electric motor 10.1 receives signals, it drives the sheave 10 around the shaft 10.2, which shortens the length of the cord 11 that runs back to the dog's hind legs. The elastic cord means 8.1, with pulley 8, will then yield such that the cord 11 on each side of the dog's flanks constitutes a straight cord from the dog's chest to its hind legs. The dog is thus unable to kick backwards with its hind legs.

FIG. 3 shows a perspective view of the device with details 3a and 3b of two alternative configurations of the electric motor 10.1 and the pulley 10.

When actuated from the master unit 4 on the dog owner's arm, the electric motor 10.1 or the spring will spin the sheave 10 around its own axis and shorten the cords 11 that are fastened to the dog's hind legs. When the cords 11 are shortened sufficiently, they prevent the dog's hind legs from kicking backwards or the dog from being able to jump up. When the dog owner wants the dog to run free again, a signal from the same transmitter can slacken the cords 11 that run from the electric motor 10.1/the spring. When the cords 11 are slackened, they are drawn up vertically along the dog's hind legs because of the elastic cord means 8.1. This means that the cord 11 is prevented from getting caught in bushes and undergrowth in the woods when the device is not active, and it prevents the cords from bunching up around the sheave 10 when they are slackened.

The invention claimed is:

1. A device for restricting a movement of a four-legged animal, the device comprising:
   an animal harness including neck straps, chest straps, and a tubular guide;
   bands arranged around hind legs of the four-legged animal;
   a cord arranged from each band to the animal harness; and
   an actuator for tightening the cord, the actuator being arranged on the animal harness,
   wherein the animal harness further comprises: a back piece running from a neck of the four-legged animal to the vicinity of a hip of the four-legged animal: a pair of back straps running from the back piece close to the hind legs of the four-legged animal and under an abdomen of the four-legged animal, the pair of back straps being joined together; and two pulleys arranged at respective ends of an elastic cord means, the elastic cord means being fastened to the animal harness,
   wherein the cord is arranged between respective bands and the animal harness via respective pulleys,
   wherein when the cord is slackened, the cord is drawn up vertically along the hind legs of four-legged animal because of the elastic cord means,
   wherein the actuator is fastened to the forward part of the animal harness,
   wherein the actuator comprises an electric motor provided for tightening the cord, and
   wherein the actuator is activated by a receiver unit that receives signals from a transmitter unit, wherein, when a signal is received from the transmitter unit of a signalling unit, the electric motor is actuated and the cord is shortened, thereby restricting the movement of the four-legged animal.

2. The device according to claim 1, wherein the four-legged animal is a dog.

3. The device according to claim 1, wherein the receiver unit and the transmitter unit communicate wirelessly.

4. The device according to claim 1, wherein the electric motor comprises a sheave, wherein the cord is shortened by the electric motor spinning the sheave around an axis of the sheave.

5. The device according to claim 1, wherein the actuator is fastened to a neck fastening provided by the neck straps of the animal harness.

6. The device according to claim 1, wherein the elastic cord means is fastened to the animal harness behind the back straps.

7. The device according to claim 1, wherein the receiver unit is located on the back piece of the animal harness and is connected to the electric motor by electric wires.

* * * * *